(12) United States Patent
Sakaguchi et al.

(10) Patent No.: US 11,684,987 B2
(45) Date of Patent: Jun. 27, 2023

(54) WIRE ELECTRIC DISCHARGE MACHINING APPARATUS

(71) Applicant: Sodick Co., Ltd., Kanagawa (JP)

(72) Inventors: Masashi Sakaguchi, Kanagawa (JP); Akio Hosaka, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 256 days.

(21) Appl. No.: 17/335,103

(22) Filed: Jun. 1, 2021

(65) Prior Publication Data

US 2021/0387275 A1    Dec. 16, 2021

(30) Foreign Application Priority Data

Jun. 16, 2020   (JP) .............................. JP2020-103651

(51) Int. Cl.
*B23H 7/10*    (2006.01)
*B23H 7/30*    (2006.01)

(52) U.S. Cl.
CPC .............. *B23H 7/30* (2013.01); *B23H 7/105* (2013.01)

(58) Field of Classification Search
None
See application file for complete search history.

(56) References Cited

U.S. PATENT DOCUMENTS 5,159,167 A    10/1992  Chaikin et al.
2009/0143891 A1*  6/2009  Lin .......................... B23H 7/26
                                                         700/110

FOREIGN PATENT DOCUMENTS

| EP | 3072621 | 9/2016 |
|---|---|---|
| JP | S62176735 | 8/1987 |
| JP | S6342981 | 3/1988 |
| JP | S6342981 | 11/1988 |
| JP | H0741474 | 5/1995 |
| JP | 2013255976 A | * 12/2013 |
| JP | 5922995 | 5/2016 |

OTHER PUBLICATIONS

Machine translation of Japan Patent No. 2013-255,976-A, Apr. 2023 (Year: 2023).*

* cited by examiner

*Primary Examiner* — Geoffrey S Evans
(74) *Attorney, Agent, or Firm* — JCIPRNET

(57) ABSTRACT

A wire electric discharge machining apparatus is provided. The wire electric discharge machining apparatus includes an upper support that supports an upper guide unit that guides a wire electrode on an upper side. The upper support includes an arm having a lower end provided with the upper guide unit, an axis drive portion moving the arm in at least one axial direction and made of a material that has a larger coefficient of linear expansion than ceramics, and an adjustment block connecting the arm and the axis drive portion and made of ceramics. The adjustment block is fixed at a position where a displacement of the upper guide unit caused by expansion and contraction of the upper support is suppressed by a bimetal effect occurring on a fastening surface of the axis drive portion and the adjustment block.

14 Claims, 10 Drawing Sheets

WIRE ELECTRIC DISCHARGE MACHINING APPARATUS

CROSS-REFERENCE TO RELATED APPLICATION

This application claims the priority benefit of Japan application serial no. 2020-103651, filed on Jun. 16, 2020. The entirety of the above-mentioned patent application is hereby incorporated by reference herein and made a part of this specification.

BACKGROUND

Technical Field

The disclosure relates to a wire electric discharge machining apparatus that performs electric discharge machining by using a wire electrode, and particularly relates to an electric discharge machining apparatus including an upper support and a lower support, the upper support supporting an upper guide unit that horizontally extends from a vertically extending column and guides a wire electrode on an upper side, the lower support supporting a lower guide unit that horizontally extends from the column and guides the wire electrode on a lower side.

Related Art

Conventionally, there is known a wire electric discharge machining apparatus that performs electric discharge machining on a workpiece by using a wire electrode. Since the wire electric discharge machining apparatus performs machining by using the phenomenon of electric discharge between the workpiece and the wire electrode, the wire electric discharge machining apparatus is able to perform precision machining on a high hardness material such as hard metal or ceramics that is difficult to cut off by cutting.

In recent years, high hardness materials have been used in various components such as dies from the viewpoint of improving durability, and the wire electric discharge machining apparatus has been required to achieve a high level of machining accuracy.

In a general-purpose wire electric discharge machining apparatus, an upper guide unit and a lower guide unit are respectively attached to a tip of an upper support and a tip of a lower support supported to be horizontally disposed from a column side. However, in terms of overall configuration of the wire electric discharge machining apparatus, the upper support is generally formed to include one or more components including an arm and an axis drive portion. When the workpiece is machined in the wire electric discharge machining apparatus, the wire electrode is stretched with a predetermined tension between an upper wire guide housed in the upper guide unit and a lower wire guide housed in the lower guide unit. While electric discharge is caused in a machining gap formed between the traveling wire electrode and the workpiece, by moving the upper guide unit and the lower guide unit relative to the workpiece, the workpiece is cut into an arbitrary shape. In addition, by controlling relative positions of the upper guide unit and the lower guide unit, it is possible to perform so-called taper cutting in which the wire electrode is disposed at a desired angle and discharged and the workpiece is machined into a precise shape.

In such a wire electric discharge machining apparatus, the upper support and the lower support are respectively deformed due to various factors, and an error is caused in positioning accuracy of the upper guide unit or the lower guide unit attached to the tip. For example, the error with respect to external force may be reduced by using a high rigidity raw material. In addition, the error with respect to thermal displacement may be reduced by using a raw material having a relatively small coefficient of thermal expansion. However, when the temperature of the apparatus rises or falls due to heat generation or a change in temperature of the external environment, a difference in thermal expansion due to thermal displacement on a fastening surface of components made of different materials may occur and adversely affect machine accuracy or machining accuracy. Specifically, when the supports supporting the upper guide unit and the lower guide unit undergo a temperature change, the supports may expand or contract and are thermally deformed, and a problem may arise that a relative misalignment occurs between the upper guide unit and the lower guide unit and the positioning accuracy or machining accuracy is reduced.

There is known an invention in which a machining fluid is circulated through an upper support and a lower support to prevent thermal displacement of a component (for example, see Patent Document 1). Specifically, the machining fluid is circulated inside the upper support and the lower support that support a wire electrode, so as to control the upper and lower supports to the same temperature. Since the upper and lower supports are always kept at the same temperature, both supports undergo the same expansion or contraction, and therefore, deterioration of machining accuracy is able to be prevented.

In addition, there is known an invention in which multiple temperature sensors that detect a temperature are disposed in an apparatus body. When wire electric discharge machining is performed, according to the temperature detected by the temperature sensors, a thermal deformation amount of the apparatus is calculated and a movement amount is corrected (for example, see Patent Document 2).

Furthermore, there is disclosed an invention relating to a wire electric discharge machining apparatus in which difference in material is considered and a horizontal length of each component is selected so that a change amount of an upper support due to a temperature change is equal to a change amount of a lower support due to a temperature change (for example, see Patent Document 3).

PATENT DOCUMENTS

[Patent Document 1] Japanese Utility Model Publication No. S63-42981
[Patent Document 2] Japanese Laid-Open Publication No. S62-176735
[Patent Document 3] Japanese Patent No. 5922995

However, in the method of circulating the machining fluid inside the apparatus as in Patent Document 1, the apparatus may be increased in size, and expenses may be incurred for a machining fluid circulation apparatus or for maintenance of the machining fluid. In the method of using the temperature sensor as in Patent Document 2, a purchasing expense for additional components such as the temperature sensor may be incurred; furthermore, when the temperature of the apparatus body cannot be accurately measured in real time, a time lag may occur in a correction value and an error may occur in correction.

Therefore, as a result of diligent studies of the invention disclosed in Patent Document 3, the inventors have exercised their ingenuity in structure, thereby arriving at an upper support that is simple and low cost and that minimizes thermal displacement.

Therefore, the disclosure provides an electric discharge machining apparatus having a simple structure and low cost and capable of improving positioning accuracy and machining accuracy.

SUMMARY

The disclosure provides a wire electric discharge machining apparatus, including: an upper support, configured to support an upper guide unit that guides a wire electrode on an upper side. The upper support includes: an arm, having a lower end provided with the upper guide unit; an axis drive portion, provided on a back surface of the arm, the axis drive portion being configured to move the arm in at least one axial direction, and the axis drive portion being made of a material that has a larger coefficient of linear expansion than that of ceramics; and an adjustment block, configured to connect the arm and the axis drive portion, and the adjustment block being made of ceramics. The adjustment block is fixed at a position where a displacement of the upper guide unit caused by expansion and contraction of the upper support is suppressed by a bimetal effect occurring on a fastening surface of the axis drive portion and the adjustment block.

DESCRIPTION OF THE EMBODIMENTS

Figure 1:
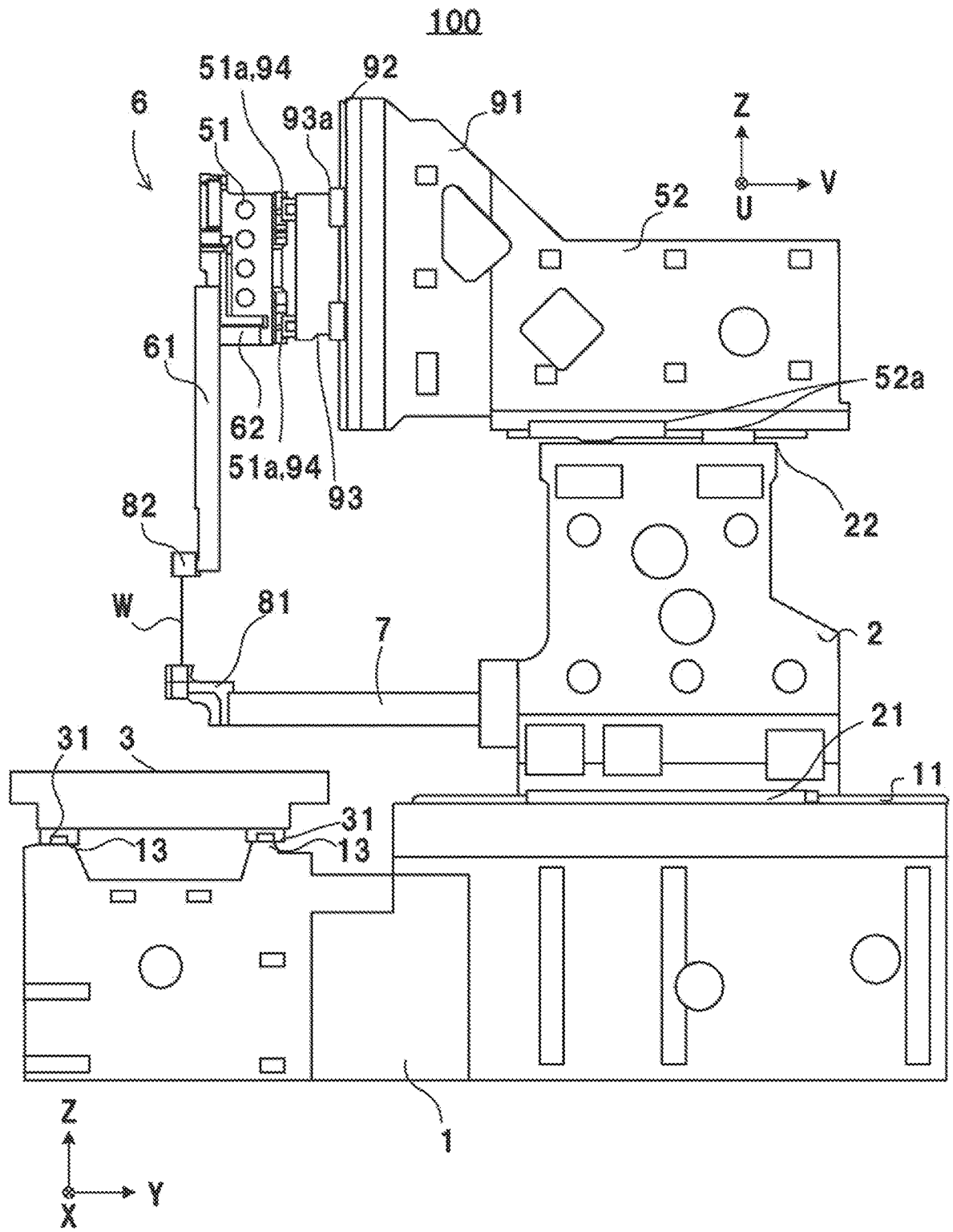
FIG. 1 is a side view showing an outline of a wire electric discharge machining apparatus 100 according to an embodiment of the disclosure.

The disclosure provides a wire electric discharge machining apparatus, including: an upper support, configured to support an upper guide unit that guides a wire electrode on an upper side. The upper support includes: an arm, having a lower end provided with the upper guide unit; an axis drive portion, provided on a back surface of the arm, the axis drive portion being configured to move the arm in at least one axial direction, and the axis drive portion being made of a material that has a larger coefficient of linear expansion than that of ceramics; and an adjustment block, configured to connect the arm and the axis drive portion, and the adjustment block being made of ceramics. The adjustment block is fixed at a position where a displacement of the upper guide unit caused by expansion and contraction of the upper support is suppressed by a bimetal effect occurring on a fastening surface of the axis drive portion and the adjustment block.

Here, the "axis drive portion" is a drive mechanism configured for moving the arm in an axial direction, and at least refers to a drive mechanism to which the arm is fixed via the adjustment block. Specifically, in the embodiment, the axis drive portion at least includes a U-axis slider.

When the temperature of the upper support changes, the entire upper support expands or contracts, and a relative misalignment occurs between the upper guide unit and the lower guide unit. Therefore, by fixing the arm and the axis drive portion via the adjustment block instead of fixing the arm and the axis drive portion directly, a displacement in an opposite direction to an expansion and contraction direction of the upper support is caused by the bimetal effect occurring in the arm and the axis drive portion made of different materials. As a result, it is possible to suppress the relative misalignment between the upper guide unit and the lower guide unit.

In the wire electric discharge machining apparatus of the disclosure, an upper surface of the adjustment block is fixed to a bottom surface of the axis drive portion.

In a structure of the disclosure, the upper surface of the adjustment block made of ceramics is fixed to the bottom surface of the axis drive portion made of the material having a larger coefficient of linear expansion than that of ceramics, and the arm is not directly fixed to the axis drive portion. With such a structure, by the bimetal effect occurring on the fastening surface of the adjustment block and the axis drive portion, a displacement in the direction opposite to that of expansion or contraction of the upper support due to a temperature change is caused in the upper guide unit, and it is possible to eliminate misalignment of the upper guide unit.

In the wire electric discharge machining apparatus of the disclosure, the adjustment block is provided to protrude from the back surface of the arm.

In addition, in the wire electric discharge machining apparatus of the disclosure, the arm and the adjustment block are integrally molded.

Moreover, in the wire electric discharge machining apparatus of the disclosure, the arm and the adjustment block are formed in an inverted L-shape as a whole in side view.

According to the disclosure, it is possible to suppress the relative misalignment between the upper guide unit and the lower guide unit by low cost and a simple configuration such as the configuration in which the adjustment block is provided to protrude from the back surface of the arm and the configuration in which the arm and the adjustment block are formed in an inverted L-shape as a whole in side view.

Furthermore, it is possible to simplify a manufacturing process by integrally molding the adjustment block with the arm.

In the wire electric discharge machining apparatus of the disclosure, simply by disposing the adjustment block made of ceramics on the axis drive portion made of the material having a larger coefficient of linear expansion than ceramics, it is possible to minimize a displacement of the upper guide unit caused by thermal expansion or contraction of the upper support. It is possible to provide a simple, low cost and high accuracy wire electric discharge machining apparatus in which a relative misalignment due to a temperature change is suppressed.

1. First Embodiment (1.1. Overall Configuration of Wire Electric Discharge Machining Apparatus 100)

Figure 2:
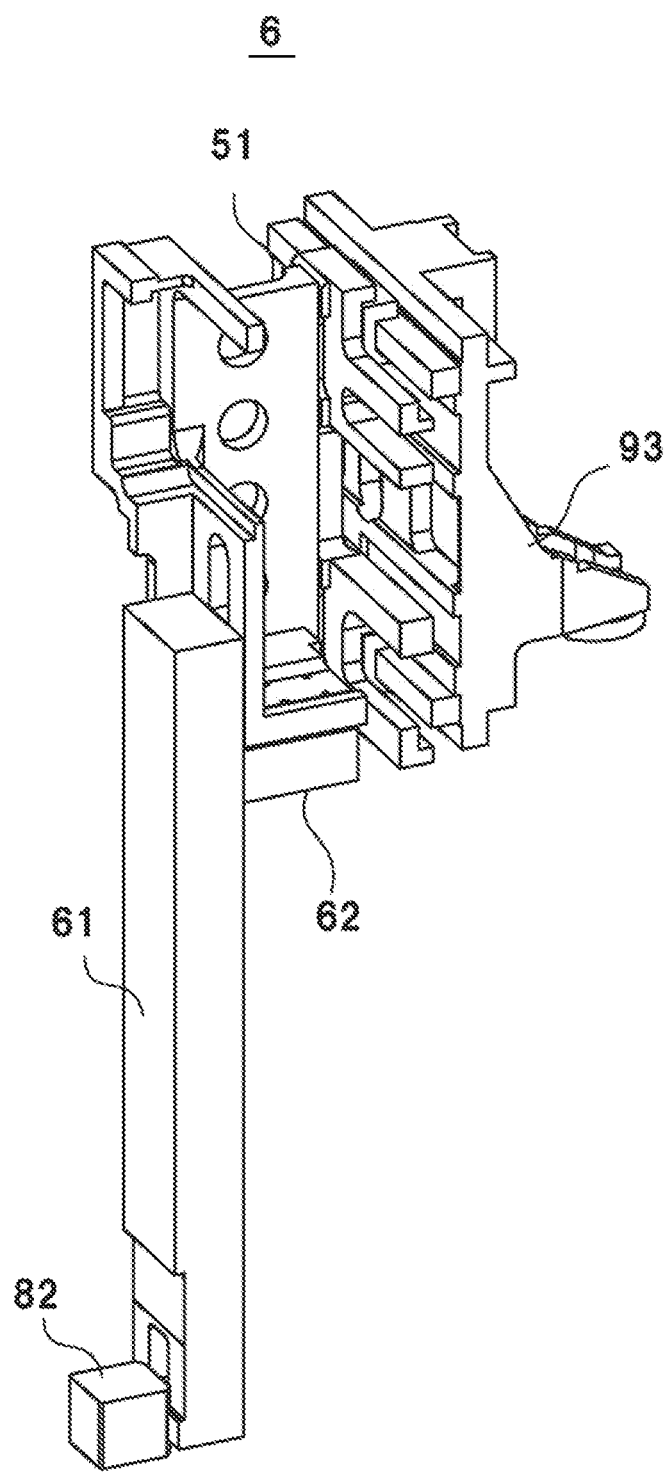
FIG. 2 is a perspective view showing an implementation of an upper support 6 of the embodiment.
Figure 3:
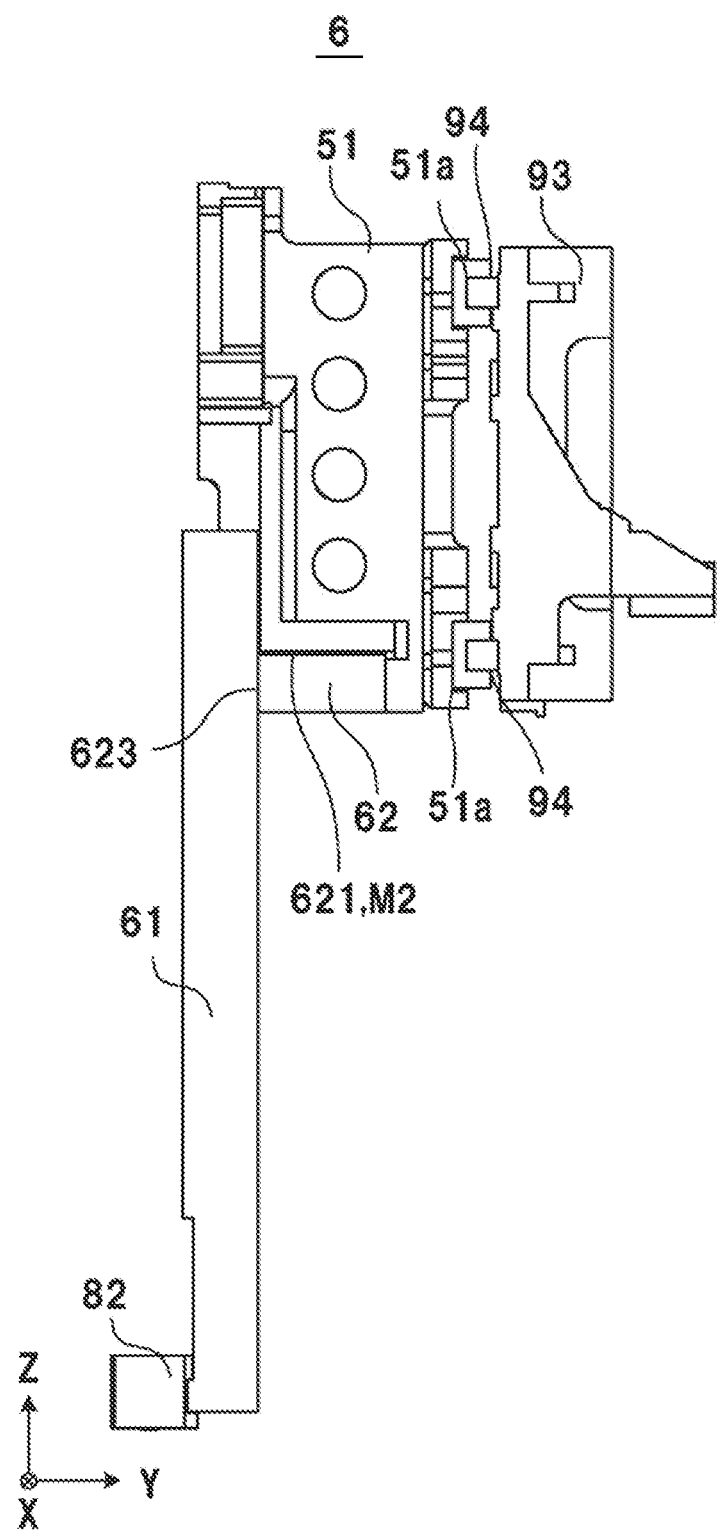
FIG. 3 is a side view showing an implementation of the upper support 6 of the embodiment.

Hereinafter, a first embodiment of the disclosure is described in detail with reference to the drawings. FIG. 1 is a side view showing an outline of a wire electric discharge machining apparatus 100 according to an embodiment of the disclosure. FIG. 2 is a perspective view showing an implementation of an upper support 6 of the embodiment. FIG. 3 is a side view showing an implementation of the upper support 6 of the embodiment. In the following description, in a machine body of the wire electric discharge machining apparatus 100, a surface (a surface of the machine body as viewed from the left side in FIG. 1) on a side where a vertical arm 61 is provided on a U-axis slider 51 is taken as a front surface; a surface on the rear side when facing the front surface is taken as a back surface; surfaces on the right-hand side and the left-hand side when facing the front surface are taken as side surfaces. In the case of viewing the machine body from the upper side when facing the front surface, a surface shown is taken as an upper surface; in the case of viewing the machine body from the lower side when facing the front surface, a surface shown is taken as a bottom surface.

The wire electric discharge machining apparatus 100 includes a bed 1 mounted on an installation surface, a column 2 installed on the bed 1 to be reciprocally movable in a Y-axis direction being a horizontal direction, a V-axis slider 52 horizontally installed on the column 2 to be reciprocally movable in a horizontal uniaxial direction (V-axis direction) parallel to the Y-axis direction, a Z-axis base 91 provided at one end of the V-axis slider 52, a Z-axis slider 93 attached to the Z-axis base 91 via a linear guide 93a to be reciprocally movable in a Z-axis direction, the U-axis slider 51 horizontally installed on a surface of the Z-axis slider 93 facing the Z-axis base 91 via a linear guide 51a to be reciprocally movable in a horizontal uniaxial direction (U-axis direction) parallel to the X-axis direction, the vertical arm 61, and an adjustment block 62 fixed to a bottom surface of the U-axis slider 51.

Here, the vertical arm 61, the adjustment block 62, the U-axis slider 51, and the Z-axis slider 93 are collectively referred to as the upper support 6.

An upper guide unit 82 is fixed to a lower end of the vertical arm 61. A lower support 7 extending from the column 2 is fixed to a sidewall on the lower side of the column 2, and a lower guide unit 81 is fixed to one end of the lower support 7.

A table 3 is disposed movable in a direction (X-axis direction) perpendicular to the Y-axis direction. A machining tank 4 (not shown) is attached on the table 3, and a workpiece may be mounted on a work stand inside the machining tank 4.

Multiple rails 11 extending in the Y-axis direction and multiple rails 13 extending in the X-axis direction are fixed to an upper portion of the bed 1. The rails 11 engage with multiple linear guides 21 fixed to a bottom portion of the column 2, and the rails 13 engage with multiple linear guides 31 fixed to a bottom portion of the table 3. As a result, the column 2 becomes linearly movable in the Y-axis direction, and the table 3 becomes linearly movable in the X-axis direction.

Multiple rails 22 extending in the V-axis direction are fixed to an upper portion of the column 2. The rails 22 engage with multiple linear guides 52a fixed to a bottom portion of the V-axis slider 52. As a result, the V-axis slider 52 becomes linearly movable in the V-axis direction.

The Z-axis base 91 is integrally fixed to one end of the V-axis slider 52.

Multiple rails 92 extending in the Z-axis direction are fixed to a front surface of the Z-axis base 91. The rails 92 engage with multiple linear guides 93a provided on the Z-axis slider 93. As a result, the Z-axis slider 93 becomes linearly movable in the vertical direction (that is, the Z-axis direction) with respect to the Z-axis base 91.

Multiple rails 94 extending in the U-axis direction are fixed to a front surface of the Z-axis slider 93. The rails 94 engage with multiple linear guides 51a provided on the U-axis slider 51. As a result, the U-axis slider 51 becomes linearly movable in the U-axis direction with respect to the Z-axis slider 93.

Known linear guides may be appropriately used as the linear guides 21, 31, 51a, 52a, and 93a. The column 2, the U-axis slider 51, the V-axis slider 52, the Z-axis slider 93, and the table 3 are reciprocated in each direction by a drive member such as a motor.

The U-axis slider 51 is a member having a substantially rectangular shape in side view. The V-axis slider 52, the Z-axis base 91, the Z-axis slider 93, and the U-axis slider 51 are made of cast iron being a material having a larger coefficient of linear expansion than ceramics, due to manufacturing restrictions.

The vertical arm 61 is a member having a long prismatic shape. The adjustment block 62 is fixed to a back surface of the vertical arm 61, and the upper guide unit 82 made of stainless steel is provided at the lower end of the vertical arm 61. The vertical arm 61 is provided perpendicular to an XY plane and is made of ceramics being a raw material that is hardly deformed by heat and has high rigidity.

The lower support 7 is a member having a prismatic shape or columnar shape fixed to a front lower portion of the column 2 and extending from the column 2. The lower guide unit 81 is fixed to a tip of the lower support 7. The lower support 7 is made of ceramics, and the lower guide unit 81 is made of stainless steel being a material having a larger coefficient of linear expansion than cast iron.

In the wire electric discharge machining apparatus 100, while a machining voltage is supplied to the workpiece and a wire electrode W from a power supply apparatus for electric discharge machining (not shown), the workpiece mounted on the work stand is relatively moved along a desired path with respect to the wire electrode W spanned between the upper guide unit 82 and the lower guide unit 81 by a control apparatus (not shown), and electric discharge machining is able to be performed.

(1.2. Configuration of Adjustment Block 62)

Figure 4:
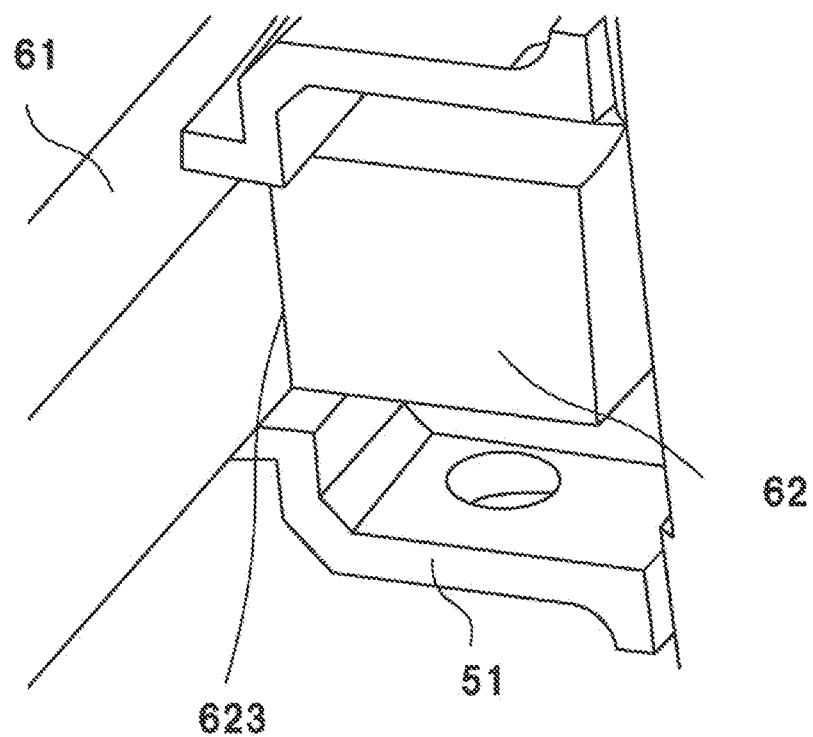
FIG. 4 is a bottom view showing an implementation of the upper support 6 of the embodiment.
Figure 5:
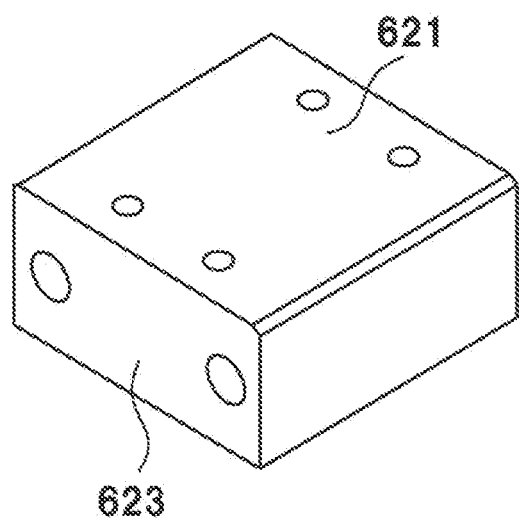
FIG. 5 is a schematic view showing an adjustment block 62 of the embodiment.
Figure 6:
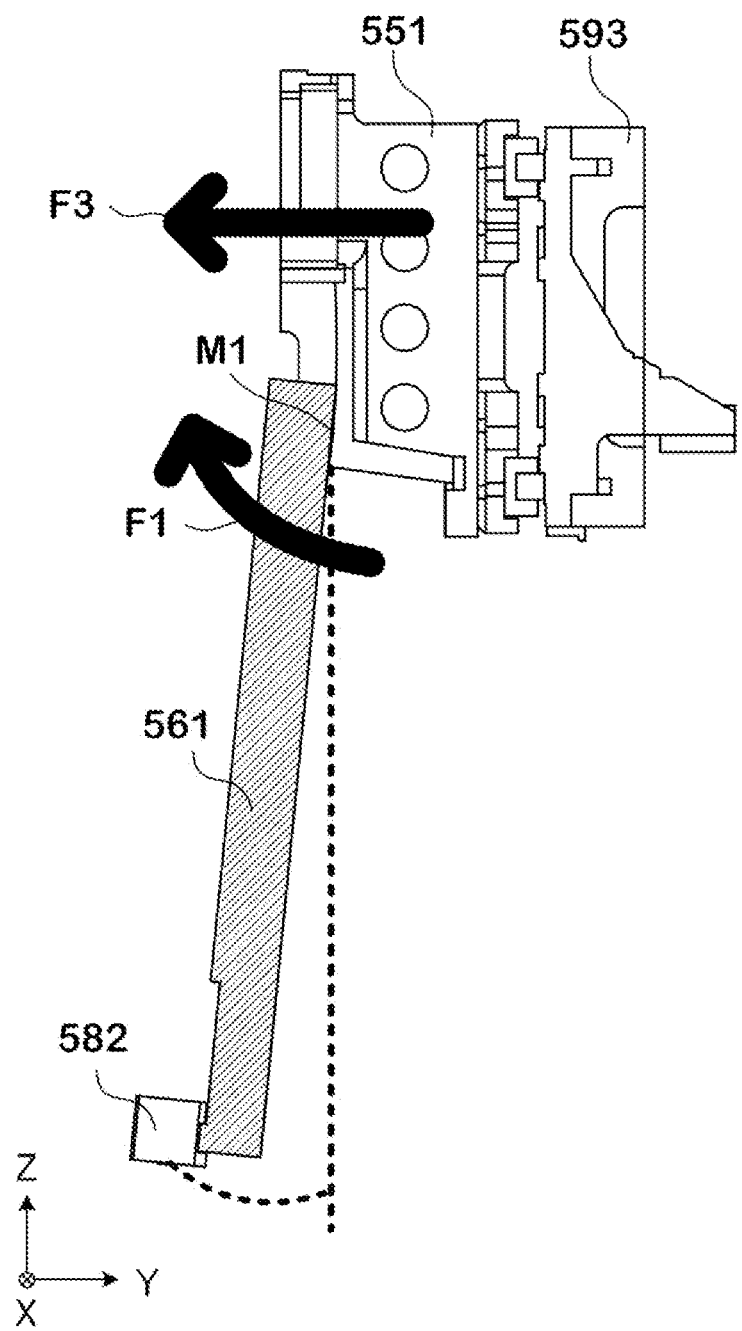
FIG. 6 is an explanatory view showing a displacement of a conventional upper support 500 when the outside air temperature rises.
Figure 7:
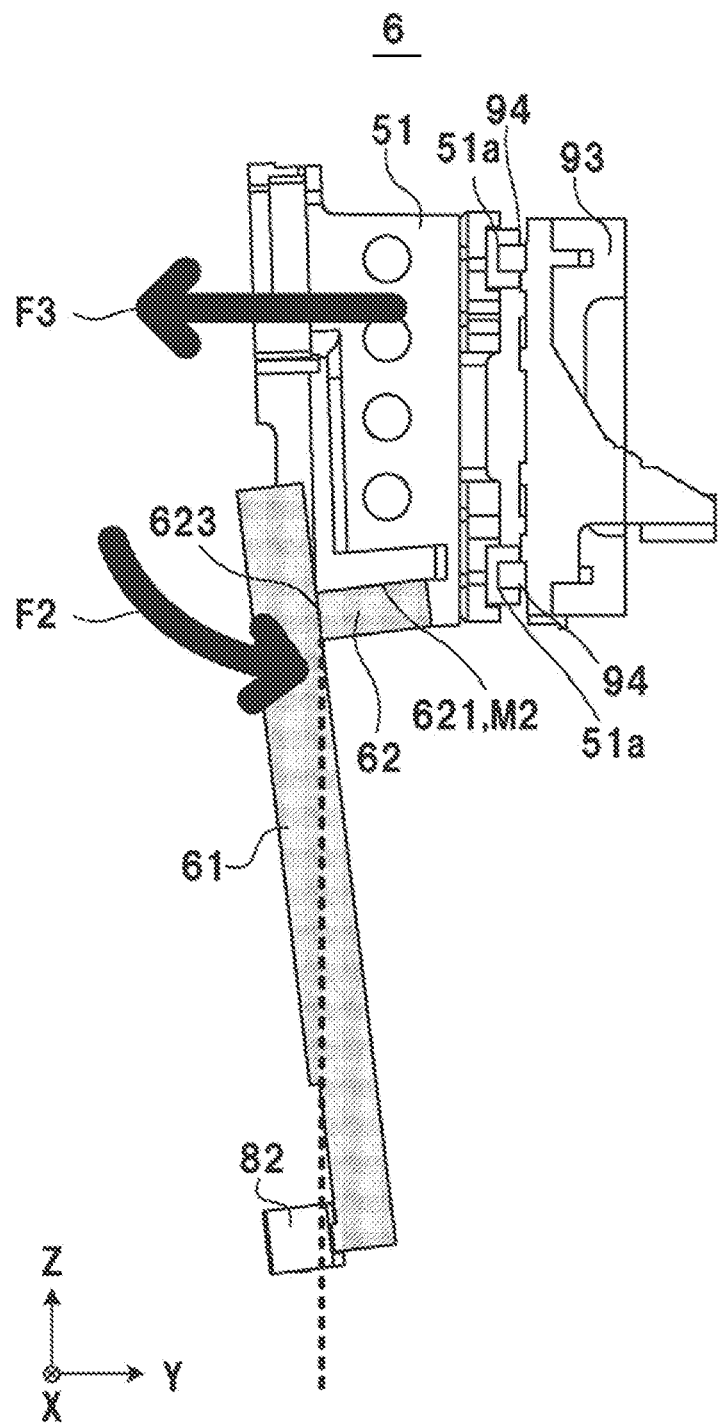
FIG. 7 is an explanatory view showing a displacement of the upper support 6 of the disclosure when the outside air temperature rises.
Figure 8:
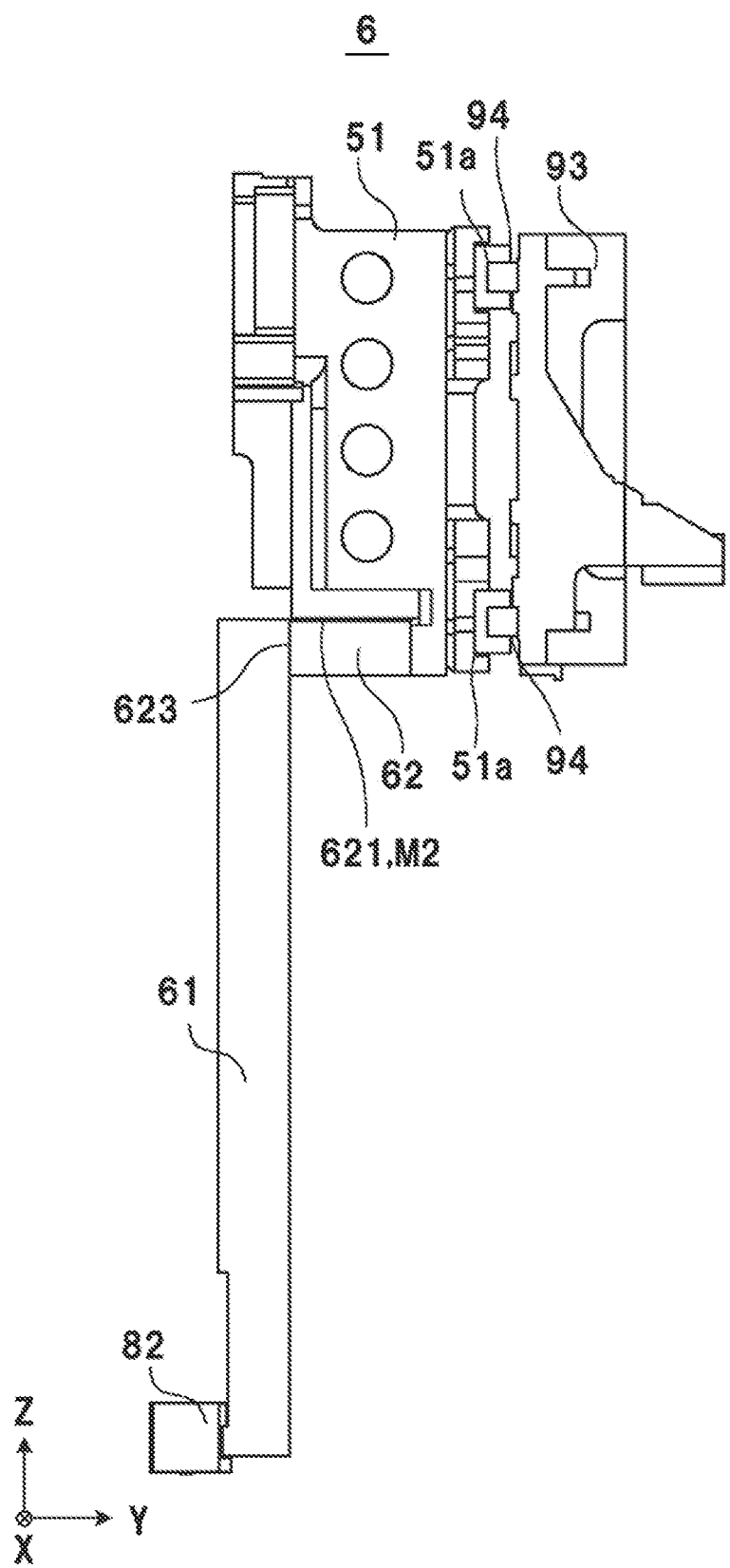
FIG. 8 is a side view showing another example of the upper support 6 of the embodiment.
Figure 10:
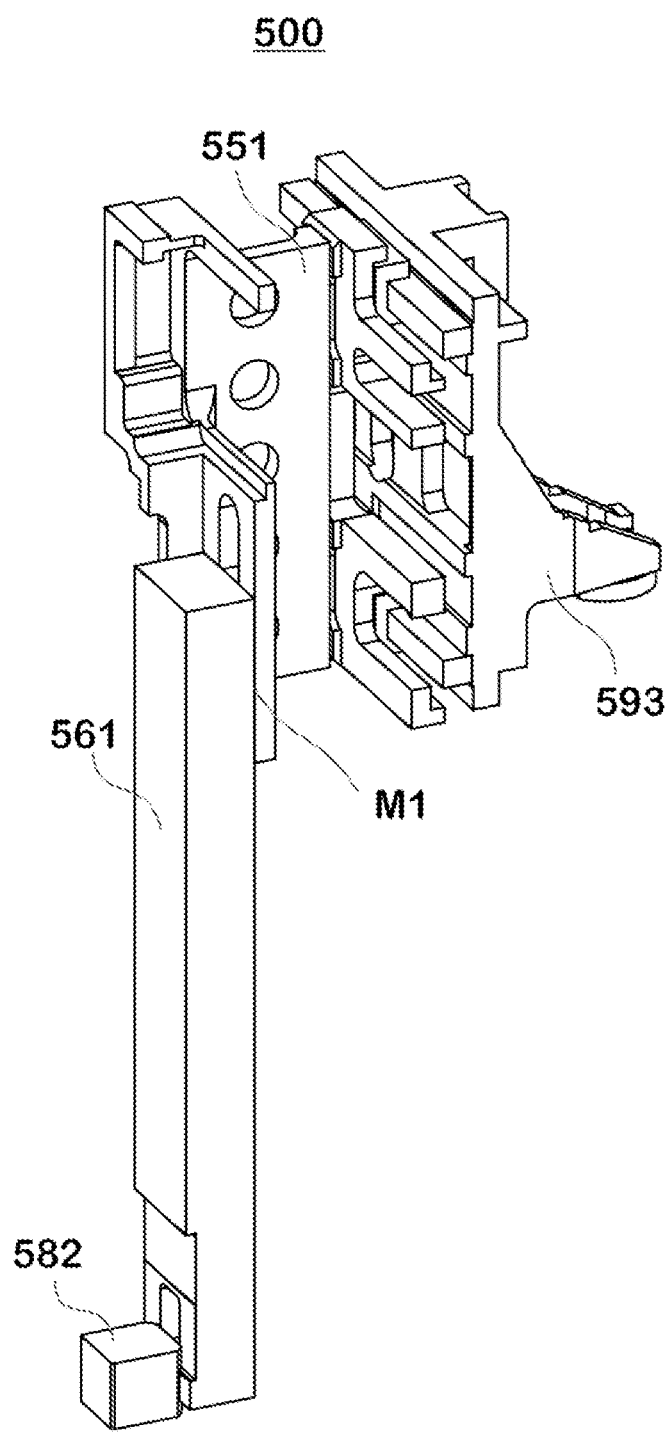
FIG. 10 is a perspective view showing the conventional upper support 500.

FIG. 4 is a bottom view showing an implementation of the upper support 6 of the embodiment. FIG. 5 is a schematic view showing the adjustment block 62 of the embodiment. FIG. 6 is an explanatory view showing a displacement of a conventional upper support 500 when the outside air temperature rises. FIG. 7 is an explanatory view showing a displacement of the upper support 6 of the disclosure when the outside air temperature rises. FIG. 8 is a side view showing another example of the upper support 6 of the embodiment. FIG. 10 is a perspective view showing the conventional upper support 500. Here, the vertical arm 61, a vertical arm 561, and the adjustment block 62 are shown by hatching in FIG. 6 and FIG. 7 for clarity.

In a conventional wire electric discharge machining apparatus, the vertical arm 561 is fixed to a U-axis slider 551 by a fastening surface M1 parallel to an XZ plane (see FIG. 6 and FIG. 10). When the temperature of the upper support 500 changes due to a change in the external environment, the entire upper support 500 extends in a front surface direction (negative Y-axis direction) or contracts in a back surface direction (positive Y-axis direction) (F3). As a result, an upper guide unit 582 provided at a lower end of the vertical arm 561 also shifts in the front surface direction or the back surface direction as the upper support 500 expands or contracts, and a relative misalignment occurs between the upper guide unit 582 and the lower guide unit 81. The reason is that a Z-axis slider 593 and the U-axis slider 551 constituting the upper support 500 are made of cast iron that is a material having a larger coefficient of linear expansion than that of ceramics in manufacturing, and expand or contract more than the lower support 7 made of ceramics.

Furthermore, an internal stress is generated on the fastening surface M1 due to a difference in coefficient of thermal expansion resulting from a difference between the materials of the U-axis slider 551 and the vertical arm 561 (bimetal effect). Specifically, since ceramics being the material of the vertical arm 561 has a coefficient of linear expansion of about ½ to about ⅓ that of cast iron being the material of the U-axis slider 551, when the temperature rises, compressive and tensile stresses acting parallel to the fastening surface M1 increase, a force F1 inclined from a vertical direction is generated on the vertical arm 561, and the upper guide unit 582 may shift in the front surface direction. When the temperature falls, a force opposite to the force F1 inclined from the vertical direction is generated on the vertical arm 561, and the upper guide unit 582 may shift in the back surface direction.

In this way, due to two factors including thermal expansion and contraction of the upper support 500 as well as the bimetal effect between the U-axis slider 551 and the vertical arm 561, when the temperature rises, the upper guide unit 582 may shift in the front surface direction; when the temperature falls, the upper guide unit 582 may shift in the back surface direction.

Therefore, in the embodiment, an upper surface 621 of the adjustment block 62 (see FIG. 4 and FIG. 5) made of ceramics that has a smaller coefficient of thermal expansion than cast iron is fixed to a bottom surface of the U-axis slider 51 that is a fastening surface M2, and the vertical arm 61 is fixed to a front surface 623 of the adjustment block 62. The U-axis slider 51 and the vertical arm 61 are indirectly connected via the adjustment block 62 and are not directly connected to each other.

With such a structure, when the temperature rises, while the entire upper support 6 extends in the front surface direction (negative Y-axis direction) (F3) due to heat, a force F2 inclined in the back surface direction (positive Y-axis direction) acts on the vertical arm 61 due to the bimetal effect between the U-axis slider 51 and the adjustment block 62, and the shift of the upper guide unit 82 may be offset (see FIG. 7). In addition, when the temperature falls, while the entire upper support 6 contracts in the back surface direction (positive Y-axis direction), since a force inclined in the front surface direction (negative Y-axis direction) acts on the vertical arm 61 due to the bimetal effect between the U-axis slider 51 and the adjustment block 62, the shift of the upper guide unit 82 may be offset.

No matter the temperature of the upper support 6 rises or falls, it is possible to eliminate the shift of the upper guide unit 82 by a simple structural improvement, that is, addition of the adjustment block 62.

In the embodiment, the adjustment block 62 has a square shape (see FIG. 5). However, the shape of the adjustment block 62 is not limited and may be, for example, a columnar shape, as long as the shift of the upper guide unit 82 due to expansion and contraction of the upper support 6 is able to be offset by the bimetal effect occurring on the fastening surface M2 of the U-axis slider 51 and the adjustment block 62. By changing the shape or size of the adjustment block 62, the bimetal effect occurring on the fastening surface M2 is able to be adjusted, and the amount of inclination of the vertical arm 61 is able to be determined.

A material of the adjustment block 62 may be any material having a smaller coefficient of thermal expansion than the material used in the U-axis slider 51, and is preferably ceramics.

In addition, an attachment position of the adjustment block 62 to the U-axis slider 51 is not particularly limited as long as the shift of the upper guide unit 82 due to expansion and contraction of the upper support 6 is able to be offset by the bimetal effect occurring on the fastening surface M2 of the U-axis slider 51 and the adjustment block 62.

The adjustment block 62, for example, may be provided to protrude from the back surface of the vertical arm 61 (see FIG. 3), or the vertical arm 61 and the adjustment block 62 may be formed in an inverted L-shape as a whole in side view (see FIG. 8).

Furthermore, the vertical arm 61 and the adjustment block 62 may be integrally molded.

2. Simulation Example

Figure 9:
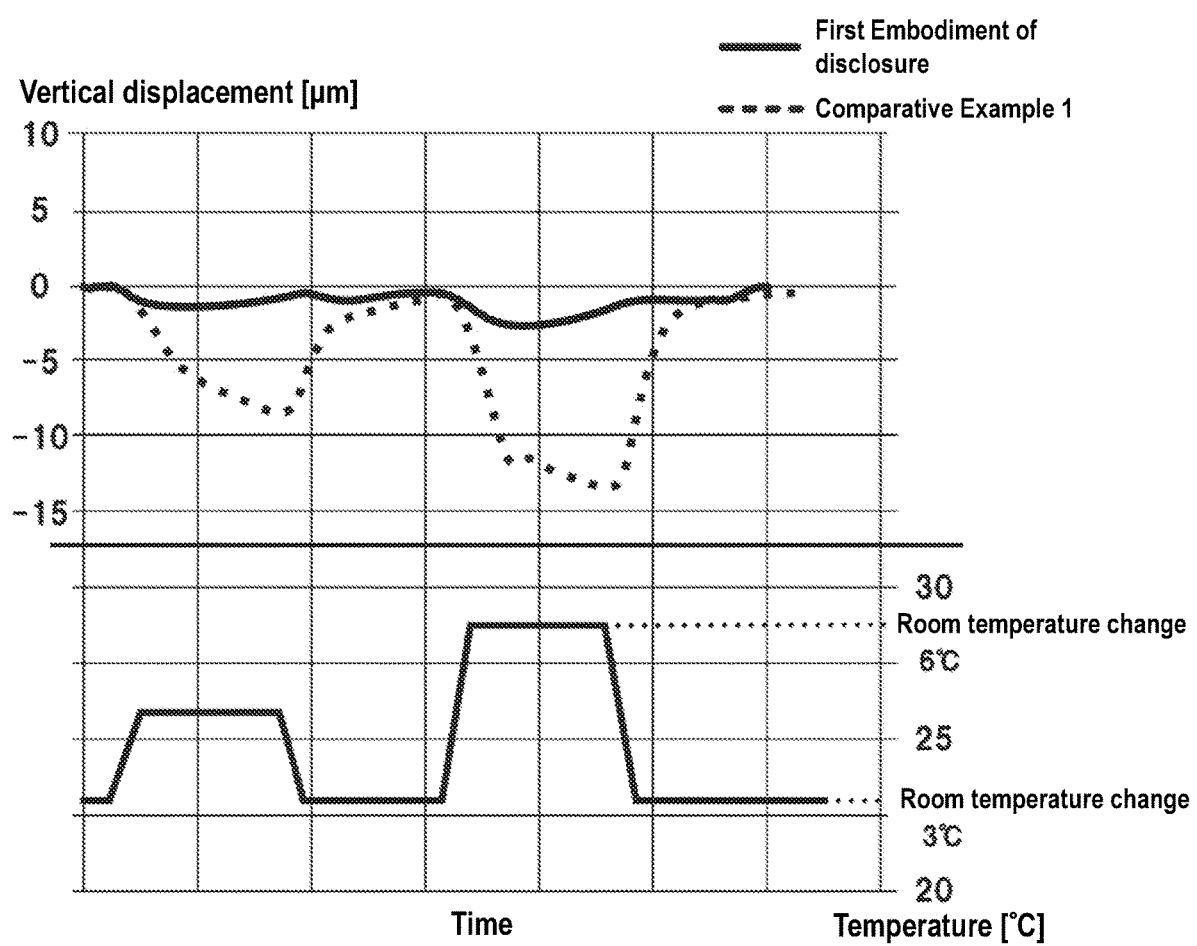
FIG. 9 is an explanatory view showing a vertical displacement [μm] of the upper support 6 of the embodiment due to a temperature change [° C.] of the external environment.

FIG. 9 is an explanatory view showing a vertical displacement [μm] of the upper support 6 of the embodiment due to a temperature change [° C.] of the external environment.

A numerical simulation is performed to compare the effects of the upper support 6 according to the embodiment and the conventional upper support 500 without the adjustment block 62 (Comparative Example 1, see FIG. 6 and FIG. 10).

Specifically, a state in which the outside air temperature (room temperature) of the upper support 6 and the upper support 500 is raised by 3° C. and a state in which the outside air temperature is raised by 6° C. are repeated as shown in the lower graph of FIG. 9, and a displacement [μm] of each of the upper guide unit 82 and the upper guide unit 582 respectively attached to the vertical arm 61 and the vertical arm 561 in the vertical direction (Z-axis direction) are measured as shown in the upper graph of FIG. 9. Here, in the upper graph of FIG. 9, the solid line shows the vertical displacement [μm] of the upper support 6 according to the embodiment of the disclosure, and the broken line shows the vertical displacement [μm] of the conventional upper support 500 of Comparative Example 1.

According to the upper graph of FIG. 9, as compared with the upper support 500 of Comparative Example 1, in the upper support 6 having the adjustment block 62, the upper guide unit 82 has less vertical shift even if the outside air temperature changes.

In this way, in the upper support 6, warping or deformation of the vertical arm 61 is able to be suppressed by a simple structure in which the adjustment block 62 is attached.

In the embodiment, the upper support 6 is configured to move in the U-axis, V-axis, Y-axis, and Z-axis directions, and the table 3 is configured to move in the X-axis direction. However, the table 3 may be configured to move in the Y-axis and X-axis directions.

In the configuration of the embodiment, the Z-axis slider 93 is provided on the front surface side of the V-axis slider 52, the U-axis slider 51 is provided on the front surface side of the Z-axis slider 93, and the vertical arm 61 is provided on the front surface side of the U-axis slider 51. However, no matter to what position the V-axis slider 52, the U-axis slider 51, and the Z-axis slider 93 are attached, the same effects may be obtained by using the adjustment block 62 if the vertical arm 61 is disposed on the front surface side with respect to an axis drive portion attached on the frontmost surface side.

The disclosure described above may be carried out in various forms without departing from the spirit and essential characteristics of the disclosure. Therefore, the embodiments described herein are examples and should not be construed as limitations to the disclosure.

What is claimed is:

1. A wire electric discharge machining apparatus, comprising:
    an upper support, configured to support an upper guide unit that guides a wire electrode on an upper side,
    wherein the upper support comprises:
        an arm, having a lower end provided with the upper guide unit;
        an axis drive portion, provided on a back surface of the arm, the axis drive portion being configured to move the arm in at least one axial direction, and the axis drive portion being made of a material that has a larger coefficient of linear expansion than that of ceramics; and
        an adjustment block, configured to connect the al ii and the axis drive portion, and the adjustment block being made of ceramics,
    wherein the adjustment block is fixed at a position where a displacement of the upper guide unit caused by expansion and contraction of the upper support is suppressed by a bimetal effect occurring on a fastening surface of the axis drive portion and the adjustment block.

2. The wire electric discharge machining apparatus according to claim 1, wherein
    an upper surface of the adjustment block is fixed to a bottom surface of the axis drive portion.

3. The wire electric discharge machining apparatus according to claim 1, wherein
    the adjustment block is provided to protrude from the back surface of the arm.

4. The wire electric discharge machining apparatus according to claim 1, wherein
    the arm and the adjustment block are integrally molded.

5. The wire electric discharge machining apparatus according to claim 1, wherein
    the arm and the adjustment block are formed in an inverted L-shape as a whole in side view.

6. The wire electric discharge machining apparatus according to claim 1, wherein the arm is made of ceramics.

7. The wire electric discharge machining apparatus according to claim 1, wherein the axis drive portion is made of cast iron.

8. The wire electric discharge machining apparatus according to claim 1, further comprising a lower support, configured to support a lower guide unit that guides a wire electrode on a lower side, and made of ceramics.

9. A wire electric discharge machining apparatus having a wire electrode vertically aligned between an upper guide unit and a lower guide unit, comprising:
    an arm, having a lower end provided with the upper guide unit;
    an axis drive portion configured to vertically move the arm, and the axis drive portion being made of cast iron;
    a lower support, made of a material that has a smaller coefficient of linear expansion than that of cast iron, and the lower guide unit being fixed to one end of the lower support; and
    an adjustment block, fixed to the arm and made of a material that has a smaller coefficient of linear expansion than that of cast iron,
    wherein an upper surface of the adjustment block is fixed to a bottom surface of the axis drive portion to connect the arm and the axis drive portion,
    wherein the adjustment block is fixed at a position where a displacement of the upper guide unit caused by expansion and contraction of the axis drive portion is suppressed by a bimetal effect occurring on a fastening surface of the axis drive portion and the adjustment block.

10. The wire electric discharge machining apparatus according to claim 9, wherein the adjustment block is made of ceramics.

11. The wire electric discharge machining apparatus according to claim 9, wherein the lower support is made of ceramics.

12. The wire electric discharge machining apparatus according to claim 9, wherein the arm extends vertically and the lower support extends horizontally.

13. The wire electric discharge machining apparatus according to claim 9, wherein the adjustment block is provided to protrude from the back surface of the arm.

14. The wire electric discharge machining apparatus according to claim 13, wherein the arm and the adjustment block are integrally molded.

\* \* \* \* \*